J. V. DAVIS.
AUTOMATIC WEIGHING AND RECORDING SCALE.
APPLICATION FILED JULY 14, 1909.
1,352,880.
Patented Sept. 14, 1920.
12 SHEETS—SHEET 5.
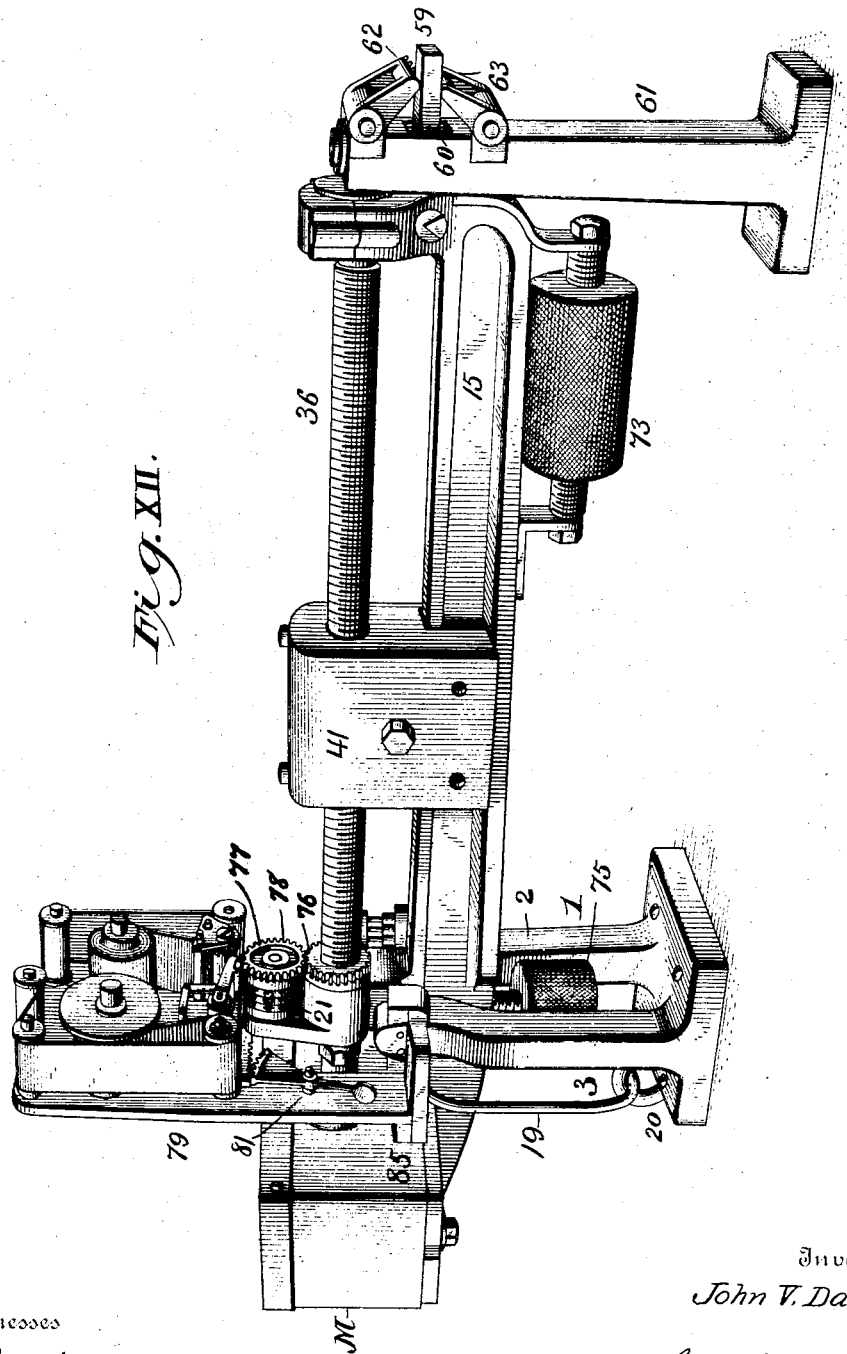
Witnesses
J. L. Ourand.
O. H. Cook.
Inventor
John V. Davis
By W. H. Singleton,
Attorney

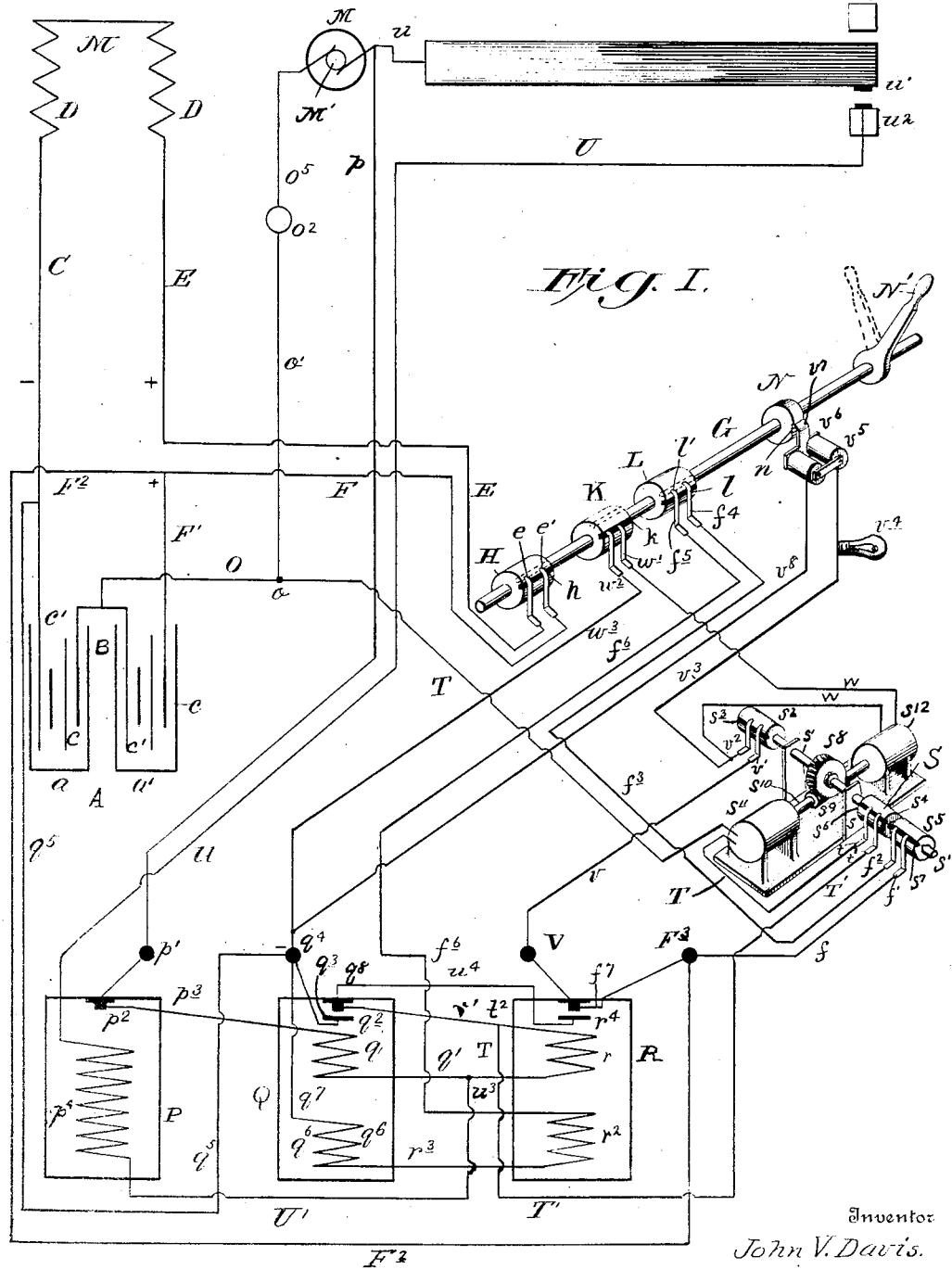

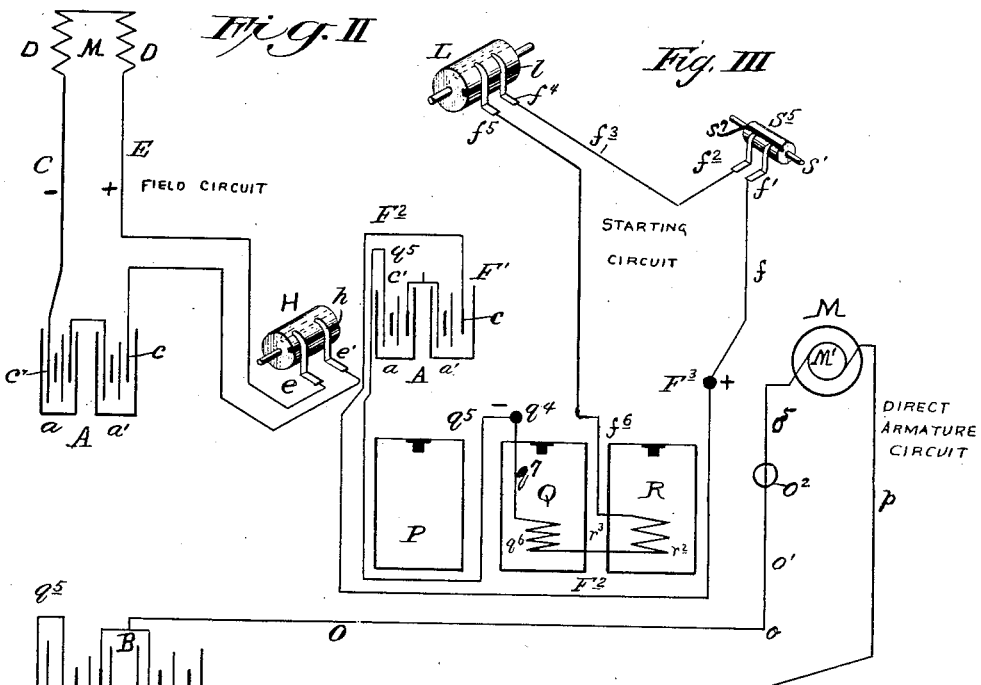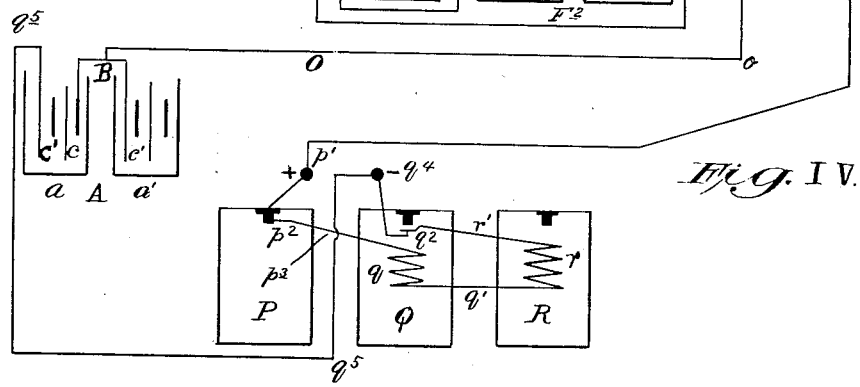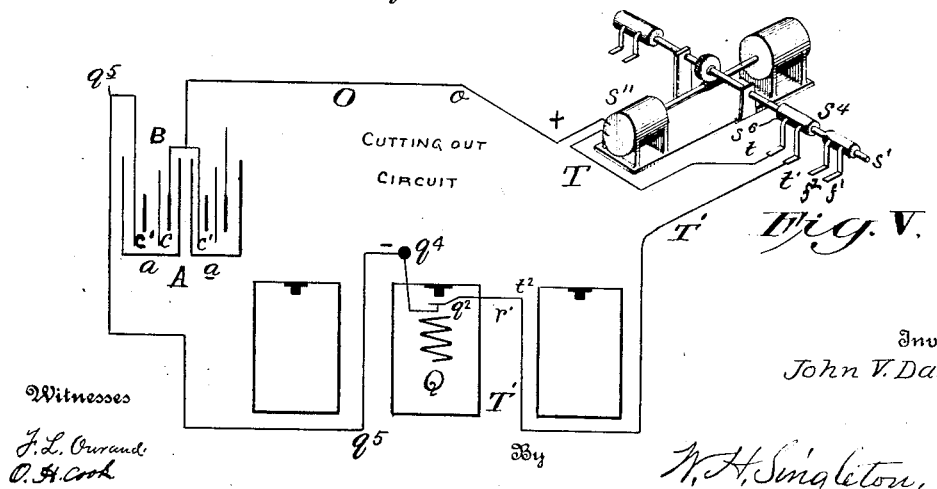

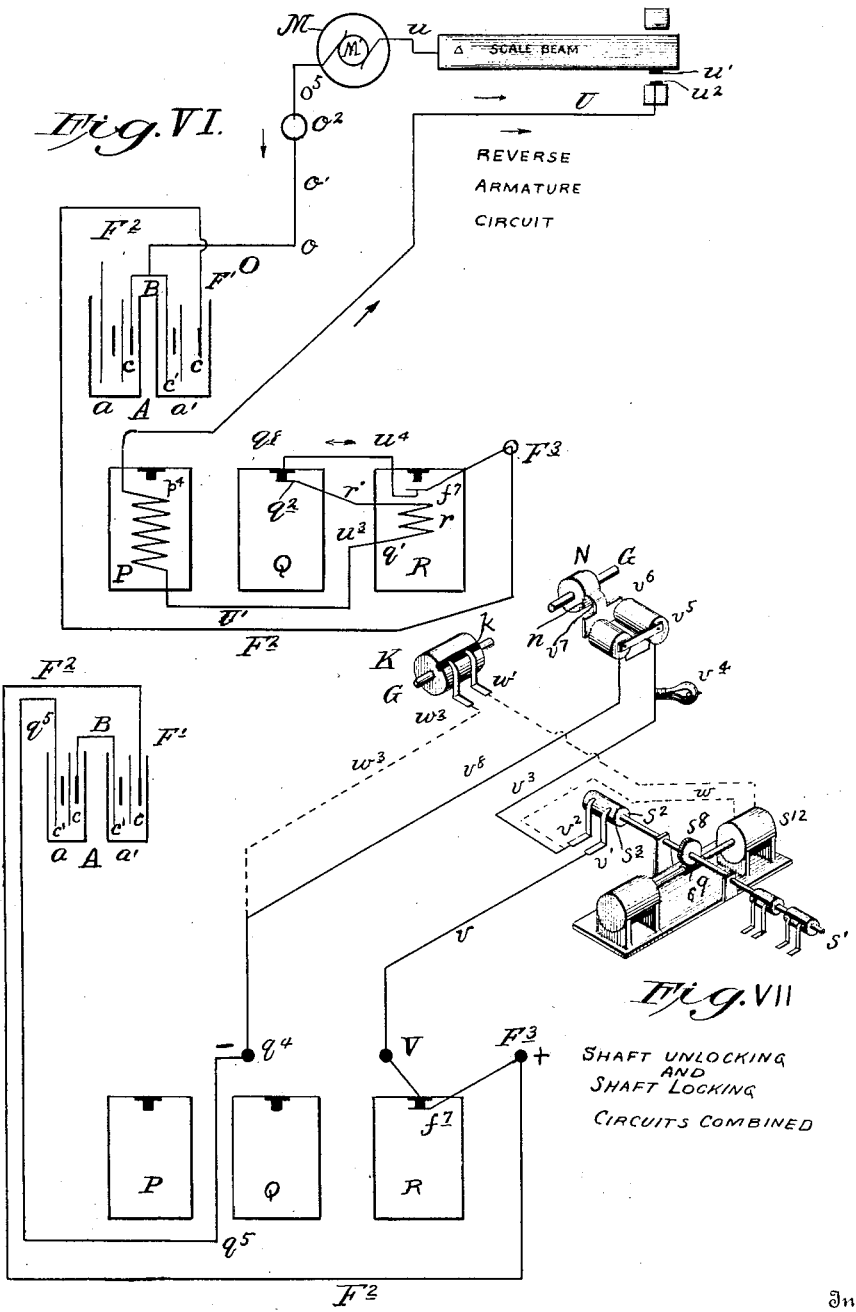

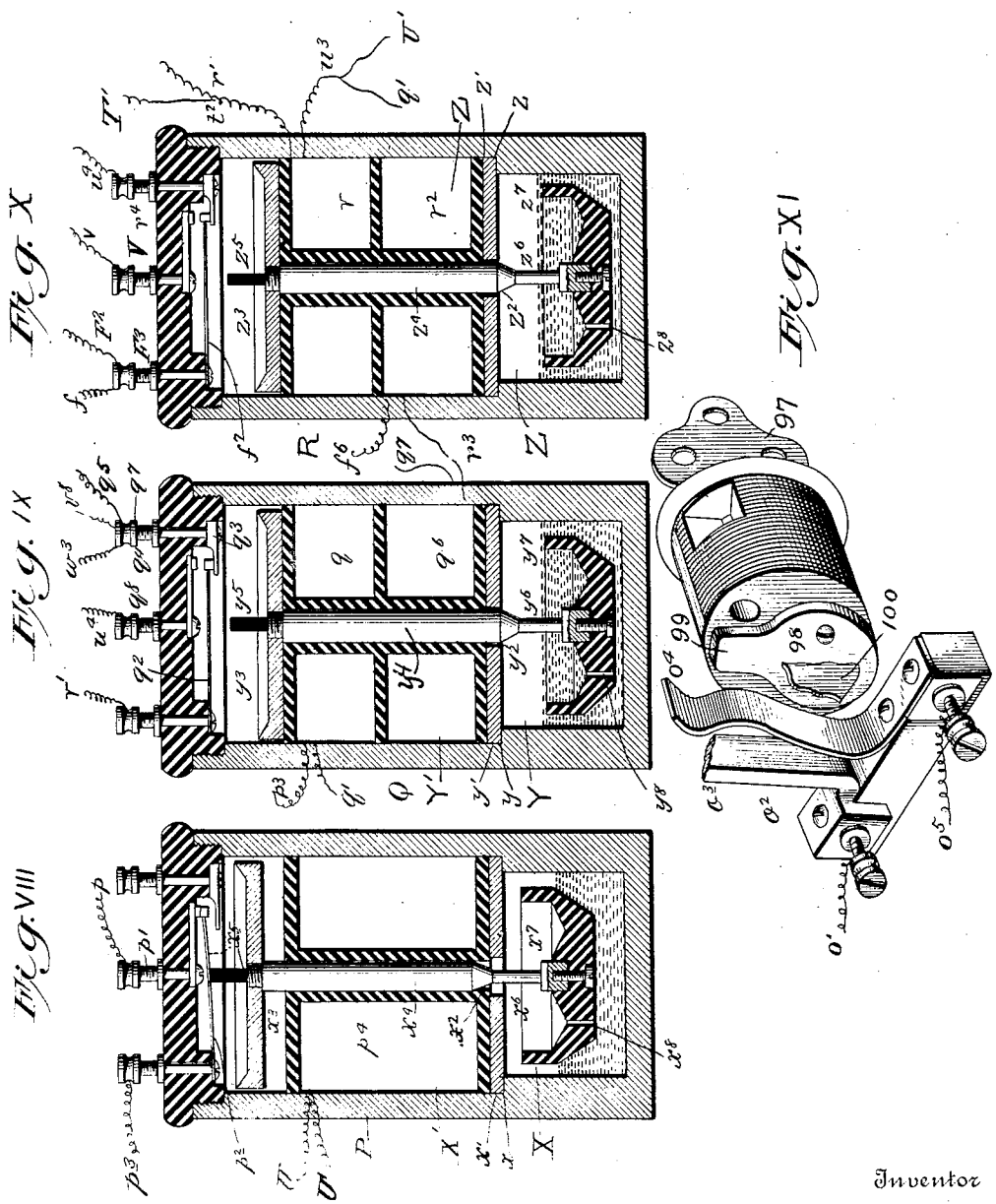

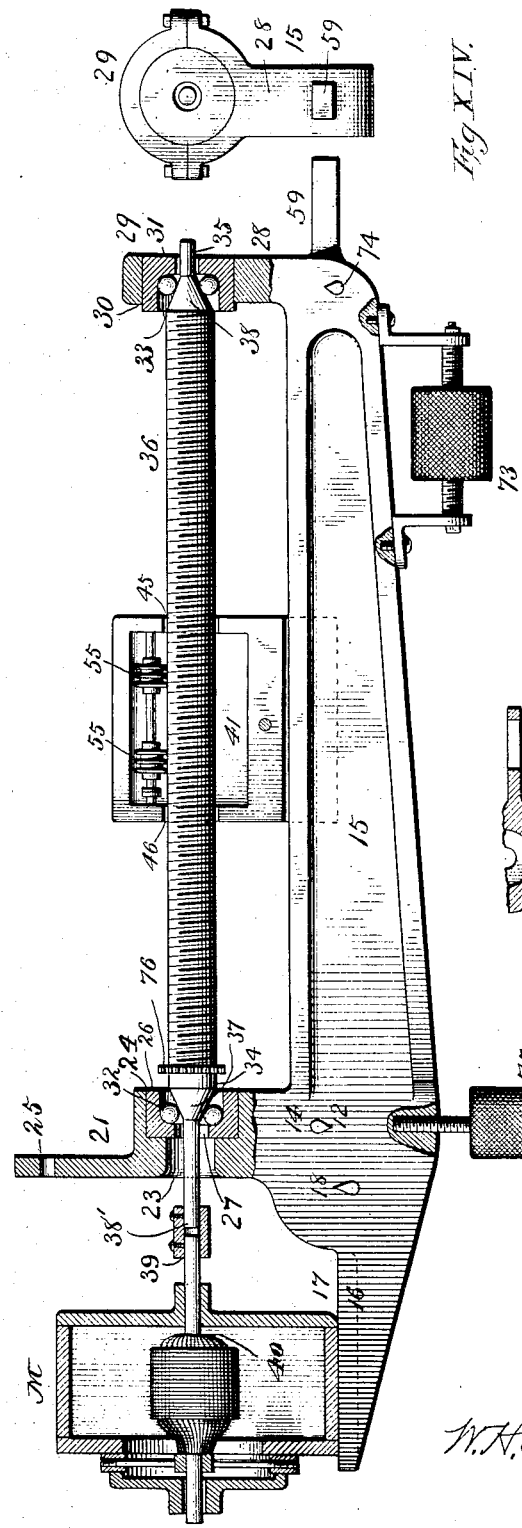

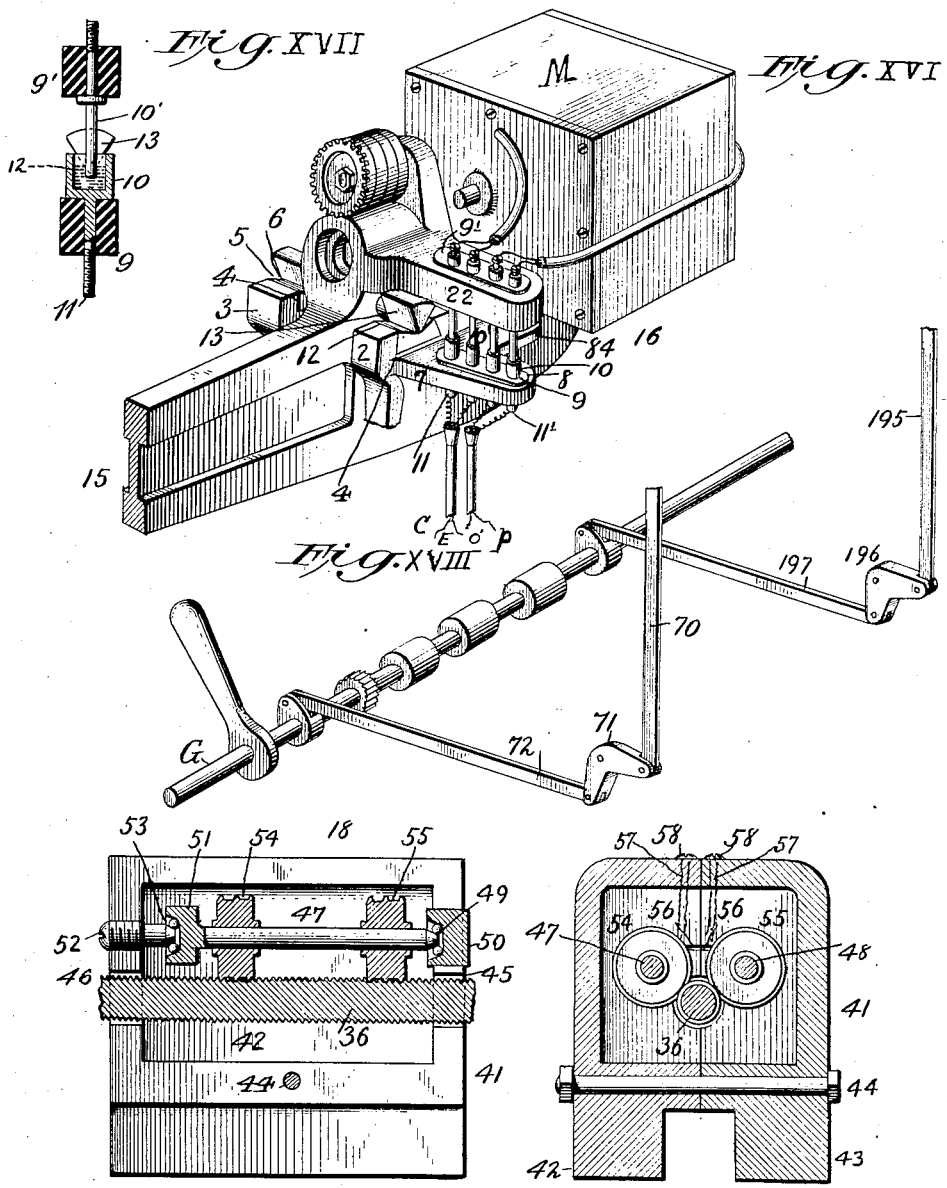

J. V. DAVIS.
AUTOMATIC WEIGHING AND RECORDING SCALE.
APPLICATION FILED JULY 14, 1909.
1,352,880.
Patented Sept. 14, 1920.
12 SHEETS—SHEET 8.
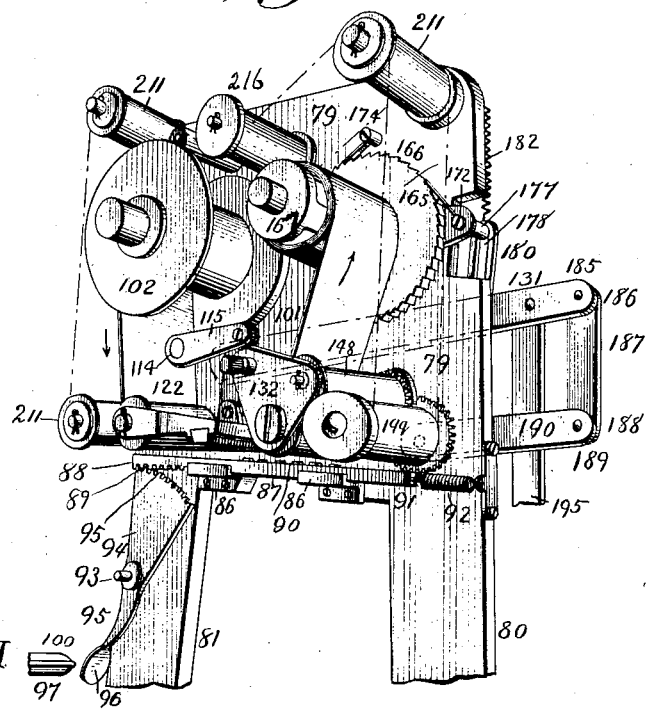
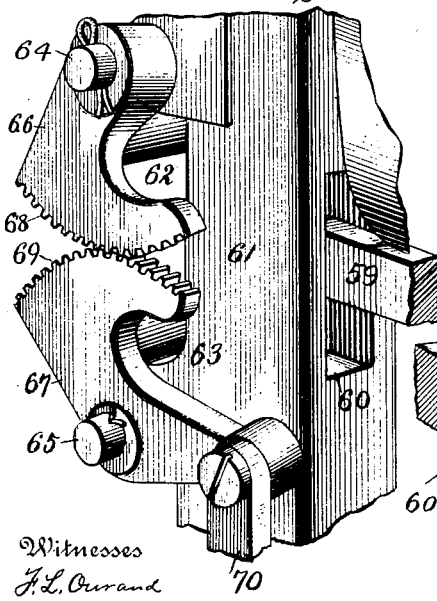
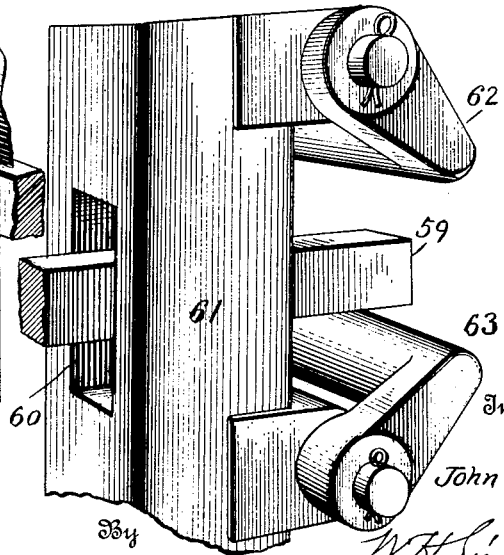
Witnesses
J. L. Ourand
O. H. Cook
Inventor
John V. Davis
By W. H. Singleton,
Attorney

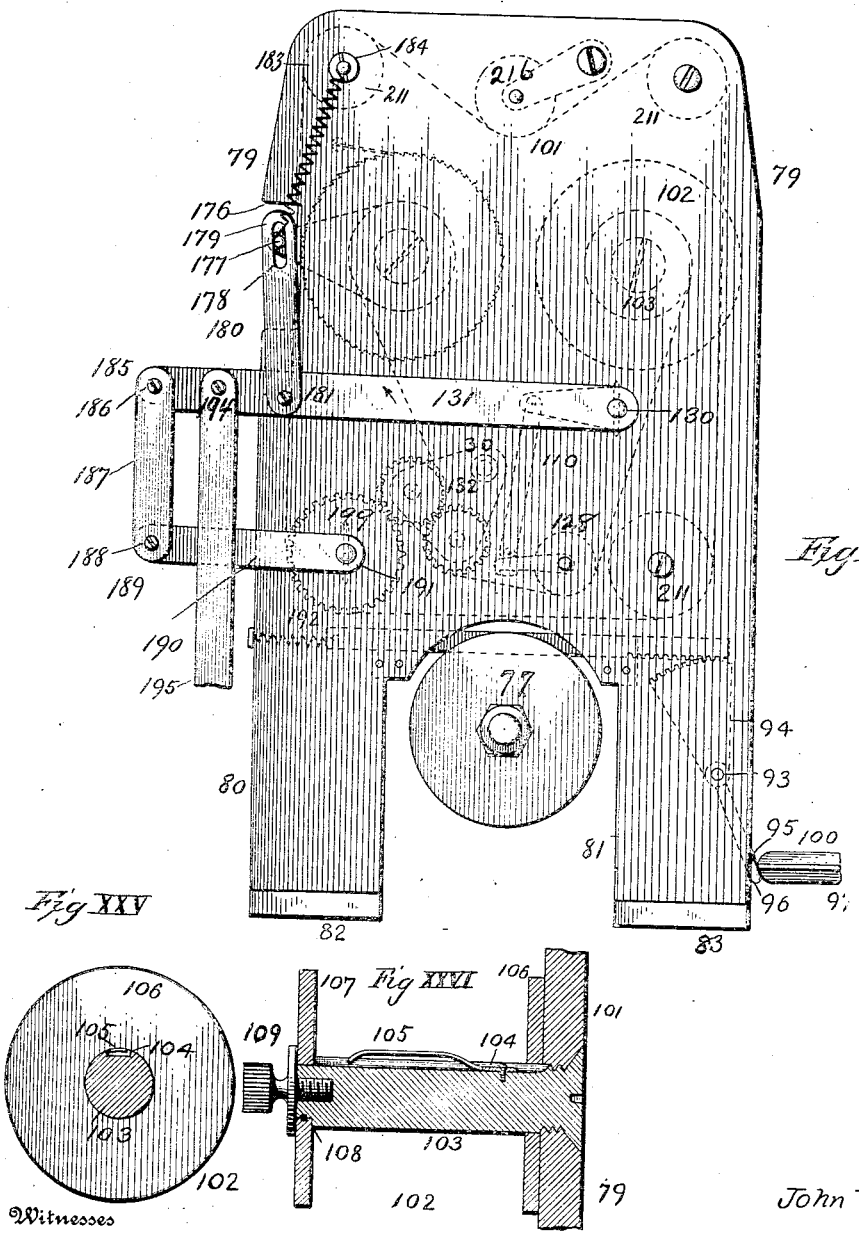

J. V. DAVIS.
AUTOMATIC WEIGHING AND RECORDING SCALE.
APPLICATION FILED JULY 14, 1909.
1,352,880.
Patented Sept. 14, 1920.
12 SHEETS—SHEET 10.
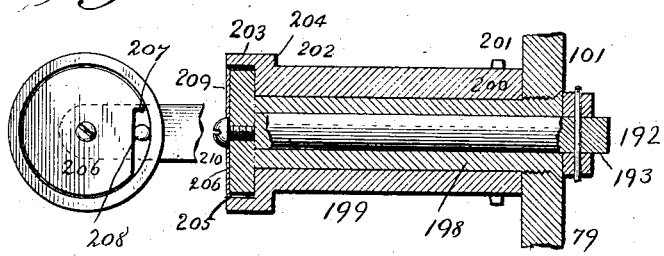
Fig. XXVII  Fig. XXVIII
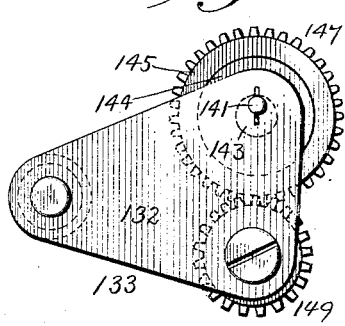
Fig. XXIX
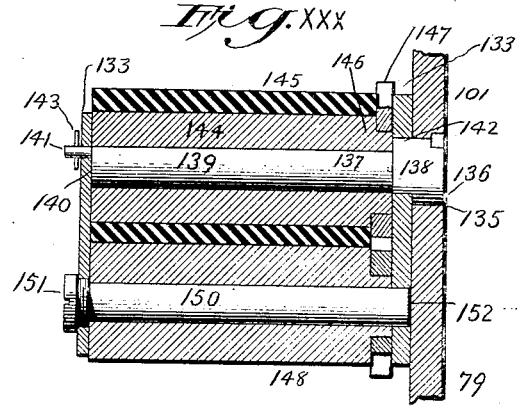
Fig. XXX
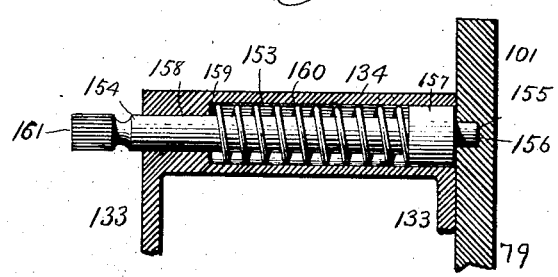
Fig. XXXI
Witnesses
J. L. Ourand.
O. H. Cook.
Inventor
John V. Davis.
By W. H. Singleton,
Attorney

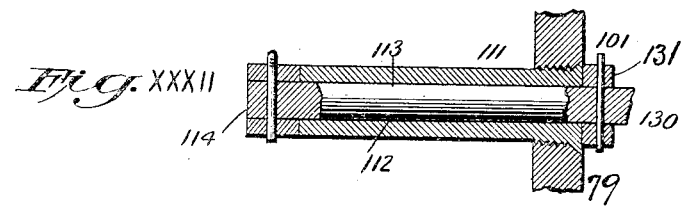
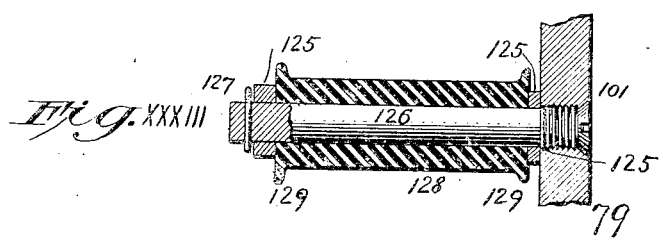
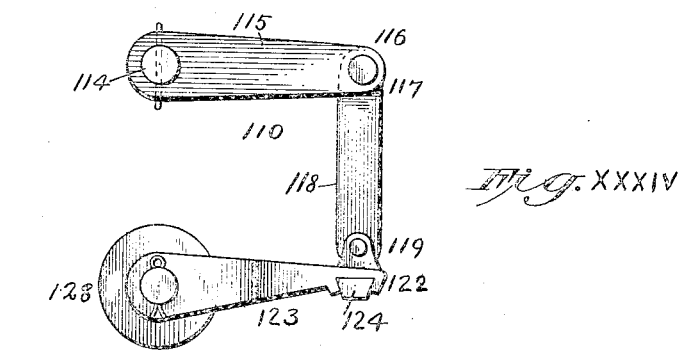
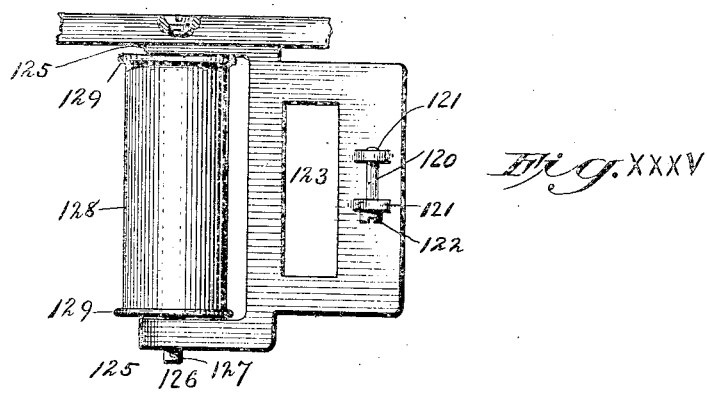

J. V. DAVIS.
AUTOMATIC WEIGHING AND RECORDING SCALE.
APPLICATION FILED JULY 14, 1909.
1,352,880.
Patented Sept. 14, 1920.
12 SHEETS—SHEET 12.
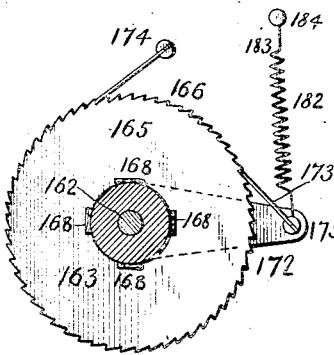
Fig. XXXVI
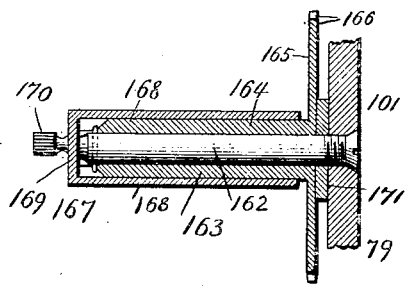
Fig. XXXVII
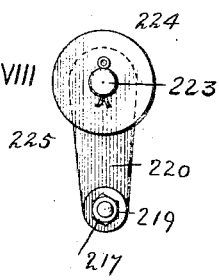
Fig. XXXVIII
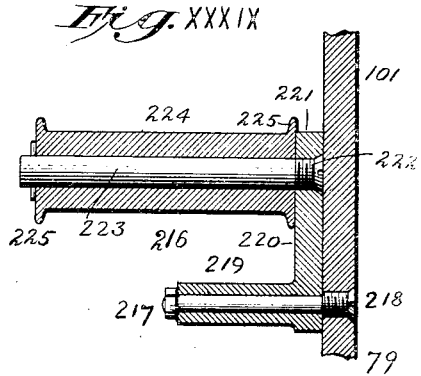
Fig. XXXIX
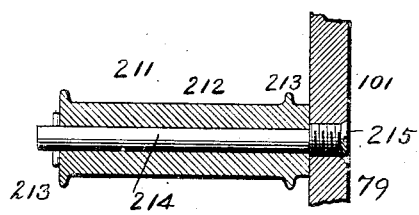
Fig. XL
Witnesses
J. L. Ourand.
O. H. Cook.
Inventor
John V. Davis.
By W. H. Singleton
Attorney

UNITED STATES PATENT OFFICE.

JOHN V. DAVIS, OF KELSEYVILLE, CALIFORNIA, ASSIGNOR, BY MESNE ASSIGNMENTS, TO BOSTON SCALE AND MACHINE CO., OF BOSTON, MASSACHUSETTS, A CORPORATION OF MASSACHUSETTS.

AUTOMATIC WEIGHING AND RECORDING SCALE.

1,352,880. Specification of Letters Patent. Patented Sept. 14, 1920.

Application filed July 14, 1909. Serial No. 507,638.

*To all whom it may concern:*

Be it known that I, JOHN V. DAVIS, a citizen of the United States, residing at Kelseyville, in the county of Lake and State of California, have invented certain new and useful Improvements in Automatic Weighing and Recording Scales, of which the following is a specification.

This invention relates to a new and useful improvement in automatic weighing and recording scales, more especially to scales known as platform scales.

The object of the present invention is to produce a scale in which after an object has been placed upon the platform and the scale started, the weighing and recording shall be done without the intervention of the operator, except to start the mechanism in operation; also to record the weight of the object weighed and to indicate the person who has done the weighing.

The invention consists essentially in a system or combination of electric circuits so arranged that when the mechanism is started all the various details relative to the weighing is done by the circuits, both in weighing, starting, and in cutting out the several circuits.

The invention further consists in a recording mechanism attached to the weighing mechanism in which the weight of the object to be weighed is recorded and at the same time there is indicated the person who does the special weighing.

The invention further consists in a double source of electricity, preferably one battery of two cells, the inside negative pole of one of them connected to the inside positive pole of the other, with a branch wire taken off at a point between the two cells.

The invention further consists in an electric motor, field windings of which are connected to the outside negative pole of one cell and to the outside positive pole of the other cell, thus obtaining the combined voltage of the two cells. A rotatable armature mounted within the magnetic field of the motor, one brush of which is connected to the wire which branches off between the two cells, the current of the other brush of which may travel through one of two paths to either the outside negative pole of one of the cells or to the outside positive pole of the other cell and thus produce rotation of the armature in a direction depending on which of these outside poles the armature wire leads to, obviously the armature runs with one-half the voltage of the combined sources of electricity.

The invention further consists in an electric motor mounted on the beam of any ordinary scale and so connected electrically that of two return paths of the armature circuit the scale beam shall form a part of one of them.

The invention further consists in a scale beam so connected with the motor that when the beam touches an electric contact at the lower extremity of its stroke it will act as an agent, working electrically through a system of relays to produce a change in the direction of rotation of the armature of the motor, after a predetermined time elapses, the scale beam being also arranged so that the subsequent breaking of the electric contact at the end of the beam will cause the armature to stop rotating instantly, by virtue of the fact that the armature circuit only is broken and the magnetic field of the motor acts as a clamp to the armature.

The invention further consists in an electric motor mounted on scale beam and so connected electrically that when weighing is started the motor will run in a direction to cause the poise to travel outwardly for a predetermined time after the beam drops to the bottom, or if the beam is already at the bottom, when the weighing is started, the motor will run in a direction to cause the poise to travel outwardly for a predetermined time after starting to run.

The invention further consists in a method of controlling the operative devices of a weighing scale so that a distinction is automatically made between temporary or false balances due to vibration, and the normal or true balance.

The invention further consists in a method of controlling the operative devices of an automatically operated weighing scale so that a predetermined time must elapse before said operative devices are permanently disconnected or deënergized, following the coming to a balanced position of the scale beam.

The invention further consists in a system of relays so connected electrically with a scale beam and a motor mounted thereon that a predetermined period of time must elapse after the scale beam rises before the starting shaft is unlocked to allow of the weight being recorded.

The invention further consists in a magnetic circuit breaking device, so connected with a system of relays and a starting shaft, that various circuits may be broken by it and by virtue of the momentum of its moving parts its own operating circuit may be broken also.

The invention further consists in details of construction both in the electrical and mechanical portions of the scale.

Previous to this invention in all the various classes of scales in which electric circuits are used the construction has been such that the operator could at any time tamper with or manipulate the mechanism so as to be guilty of fraudulent weighing. In the present device, the design is to preclude all opportunity for fraudulent weighing as the mechanism is complete in itself and is arranged so that it may not be tampered with nor manipulated by the operator.

In the annexed drawings:

Sheet I.

Figure I is a diagrammatic view of the several electric circuits employed in this invention, there being seven in all.

Sheet II.

Fig. II is a diagrammatic view of the field circuit.

Fig. III is a diagrammatic view of the starting circuit.

Fig. IV is a diagrammatic view of the direct armature circuit.

Fig. V is a diagrammatic view of the cutting-out circuit.

Sheet III.

Fig. VI is a diagrammatic view of the reverse armature circuit.

Fig. VII is a diagrammatic view of the shaft unlocking and shaft locking circuits combined, the former in full lines, the latter in full and broken lines.

Sheet IV.

Figs. VIII, IX, and X are vertical transverse sections of the relay cups.

Fig. XI is a perspective detailed view of the switch and key for operating the same.

Sheet V.

Fig. XII is a perspective view of the weight beam poise and motor, showing the outside thereof and interior perspective view of the recording mechanism.

Sheet VI.

Fig. XIII is a vertical longitudinal section through Fig. XII.

Fig. XIV is an end view of Fig. XIII.

Fig. XV is a partially transverse vertical section of Fig. XIII, taken at the gravity ball.

Sheet VII.

Fig. XVI is a perspective view of the motor end of the scale beam showing the exterior of the motor and the wiring thereto.

Fig. XVII is a detail section of the circuit connections.

Fig. XVIII is a perspective view of the shaft and connections.

Fig. XIX is a longitudinal section through the poise.

Fig. XX is a transverse section through the poise.

Sheet VIII.

Fig. XXI is an enlarged perspective view of the interior of the recording mechanism, taken from the opposite end of the view shown in Fig. XII.

Fig. XXII is an enlarged detail showing one side of the clamping mechanism at the end of the beam away from the motor.

Fig. XXIII is a view of the other side of the clamping mechanism.

Sheet IX.

Fig. XXIV is a view of the rear of the recording mechanism case, the interior portions being shown in dotted lines.

Figs. XXV and XXVI are an end view and longitudinal section of the paper-supply reel.

Sheet X.

Figs. XXVII and XXVIII are an end view and longitudinal section of the combined ink-ribbon feeder and paper-feeding roll operator.

Fig. XXIX is an end view of the frame carrying the paper-feeding rolls.

Fig. XXX is a longitudinal view of the same.

Fig. XXXI is a locking pin for the paper-feeding frame.

Sheet XI.

Fig. XXXII is a longitudinal section through the main fulcrum of the printing levers.

Fig. XXXIII is a longitudinal section through the fulcrum of the printing pad.

Fig. XXXIV is an end view of the printing pad mechanism.

Fig. XXXV is a top view of the bottom part of the printing pad mechanism, shown in Fig. XXXIV.

Sheet XII.

Fig. XXXVI is an end view of the take-up roll for the paper.

Fig. XXXVII is a longitudinal section of the stud mechanism on which the take-up roll, shown in Fig. XXXVI, is placed.

Figs. XXXVIII and XXXIX are an end view and longitudinal section of the ink-ribbon tightener.

Fig. XL is a longitudinal section of one of the guide rollers for inking ribbons.

*General description of the electrical mechanism.*

In the drawings, reference will first be made to Sheets I, II, III, and IV. In these sheets of drawings the letter A represents any source of electrical energy, in the present instance preferably a battery consisting of two cells $a$ and $a'$ having the usual positive plates $c$ and negative plates $c'$. A wire B connects the positive plate $c$ of the cell $a$ with the negative plate $c'$ of the cell $a'$. Leading from the negative plate $c'$ of the cell $a$ is a wire C connecting with the field D of the motor M. Leading from the field D of the motor M is a wire E connected to a brush $e$, of a pair of brushes $e$, $e'$. From the brush $e'$ there runs a wire F which, by a branch wire F', is connected with the positive plate $c$ of the cell $a'$. In juxtaposition with the pair of brushes $e$ and $e'$ is a shaft G having secured thereto at the brushes $e$ and $e'$ a commutator H of insulating material and having a metallic bar $h$, upon which the commutator H and the brushes $e$ and $e'$ bear. Spaced apart on this shaft G, away from the commutator H and away from each other, are two other commutators K and L of insulating material, one provided with a metallic strip $k$ and the other with a metallic strip $l$. The shaft G is also provided with a ratchet wheel N having teeth $n$, and also with an operative handle N', both rigidly secured to such shaft.

Connected to and leading from the wire B is another wire O, which branches at the point $o$. One branch $o'$ is connected with one side of a switch $o^2$ consisting of the rigid part $o^3$ and the flexible part $o^4$ (Fig. XI). Leading from the other side of the switch $o^2$ is another wire $o^5$ connected with the armature M' of the motor M. From the armature of the motor M another wire $p$ leads to the binding-post $p'$ of the relay cup P (Fig. VIII). Within the relay cup P at its top, adjacent to the binding-post $p'$, there is located the spring-contact $p^2$. From this spring-contact $p^2$ there leads a wire $p^3$ which connects with the top solenoid $q$ of the second relay cup Q. From this solenoid $q$ of the relay cup Q there leads another wire $q'$ which connects with the solenoid $r$ in the third relay cup R. From the solenoid $r$ of the relay cup R there leads another wire $r'$ which connects with a spring-contact $q^2$ in the top of the relay cup Q. Adjacent to the spring-contact $q^2$ is a contact-point $q^3$, which is connected to a binding-post $q^4$.

From the binding-post $q^4$ a wire $q^5$ is connected with the negative plate $c'$ of the cell $a$ of the battery A. See Figs. I and IX.

At a convenient location is placed a frame S upon which, in suitable standards $s$, is located a rotatable shaft $s'$, at one end of which is placed a commutator $s^2$ of insulating material provided with a metallic strip $s^3$. At the other end of the shaft $s'$ are located and spaced apart two commutators $s^4$ and $s^5$ of insulating material provided with metallic strips $s^6$ and $s^7$. At its middle, the shaft $s'$ is provided with a circular pinion $s^8$. Engaging this pinion $s^8$ is a rack $s^9$ located on a soft iron plunger $s^{10}$, the ends of which are received into the solenoids $s^{11}$ and $s^{12}$ secured to the frame S.

Leading from the wire F' connected with the battery A is another wire $F^2$ which is connected with a binding-post $F^3$ of the relay cup R. From this binding-post $F^3$ a wire $f$ leads to a brush $f'$ of a pair of brushes $f'$ and $f^2$ bearing against the commutator $s^5$ on the shaft $s'$. Leading from the brush $f^2$ is a wire $f^3$ which leads to a brush $f^4$ of a pair of brushes $f^4$ and $f^5$ bearing against the commutator L on the shaft G. From the brush $f^5$ there runs a wire $f^6$ which is connected to the solenoid $r^2$ within the relay cup R. From the solenoid $r^2$ there passes a wire $r^3$ which is connected with a second solenoid $q^6$ within the relay cup Q. From this solenoid $q^6$ runs a wire $q^7$ to the binding-post $q^4$.

From the point $o$ where the wires O and $o'$ unite, there starts a wire T which is connected with the solenoid $s^{11}$ and passing therefrom is connected to a brush $t$ of a pair of brushes $t$ and $t'$ bearing against the commutator $s^4$ on the shafts $s'$. From the brush $t'$ there runs a wire T' which is connected at $t^2$ with the wire $r'$ leading from the solenoid $r$ of the relay cup R to the spring-contact $q^2$ of the relay cup Q.

Leading from the armature M' of the motor M there is a wire $u$ connected to the inner end of the beam. At its outer end, the beam is provided with a contact point $u'$ and adjacent thereto is another contact-point $u^2$. Leading from the contact $u^2$ there is a wire U which is connected to a solenoid $p^4$ located within the relay cup P. Leading from the solenoid $p^4$ there is another wire U' which is connected at $u^3$ with the wire $q'$ leading from the solenoid $q$ of the relay cup Q to the solenoid $r$ of the relay cup R. To a binding-post $q^8$ which is adjacent to the spring-contact $q^2$ of the relay cup Q there is secured at one end a wire $u^4$ which is secured at its other end to a binding-post $r^4$ adjacent to the spring-contact $f^7$ of the relay cup R connected with the binding screw $F^3$.

Adjacent to the spring-contact $f^7$ is another binding-post V from which there runs a wire $v$, the other end of which is connected with a brush $v'$ of a pair of brushes $v'$ and $v^2$ bearing upon the commutator $s^2$ of the shaft $s'$. Leading from the brush $v^2$ is a wire $v^3$ having an electric lamp $v^4$ and connected at its other end to the electro-magnet $v^5$. This electro-magnet has an armature $v^6$ provided with a pawl $v^7$ adapted to engage the teeth $n$ of the ratchet N fastened on the shaft G. Leading from the electro-magnet $v^5$ is another wire $v^8$ which is connected to the binding-post $q^4$. From the brush $v^2$ at the commutator $s^2$ there leads another wire $w$ which is connected with the solenoid $s^{12}$ on the frame S and passing therefrom is connected with a brush $w'$ of a pair of brushes $w'$ and $w^2$ bearing against the commutator K on the shaft G. From the commutator K there runs another wire $w^3$ connected with the binding-post $q^4$ of the relay cup Q.

Relay cups.

The relay cups which have been adverted to already and which are used in the various circuits, are constructed as follows. Each cup is made of metal, preferably soft iron. The cups have in their bottoms the mercury cisterns X, Y and Z, the mercury being indicated by the horizontal dotted lines therein. Above these cisterns are chambers X', Y' and Z'. These chambers are larger than the cisterns and have at their bottoms the rabbets or shoulders $x$, $y$ and $z$. Placed on these shoulders are plates $x'$, $y'$ and $z'$ having the central holes $x^2$, $y^2$ and $z^2$. Above these plates are placed in the chambers solenoids. In the relay cup P there is but one solenoid $p^4$. In the relay cup Q there are two solenoids $q$ and $q^6$, one above the other. In the relay cup R there are two solenoids $r$ and $r^2$, one above the other. Above these solenoids are other metal plates $x^3$, $y^3$ and $z^3$. Passing down through the center of these solenoids are the soft cores $x^4$, $y^4$ and $z^4$. At their tops, these soft metal cores $x^4$, $y^4$ and $z^4$ are securely fastened to the metal plates $x^3$, $y^3$ and $z^3$, the upper ends $x^5$, $y^5$ and $z^5$ of these soft metal cores protruding beyond the metal plates $x^3$, $y^3$ and $z^3$, and are composed of insulating material. The lower ends $x^6$, $y^6$ and $z^6$ of these soft metal cores pass loosely through the holes in the plates $x'$, $y'$ and $z'$ and have secured thereon hard rubber cups $x^7$, $y^7$ and $z^7$, each provided respectively with a passage $x^8$, $y^8$ and $z^8$ passing down through their bottoms leading from their interior cavities to the outside. These passages vary in size. The sizes are such that as the cup is immersed in the mercury and is then floated and the mercury passes from the interior of the cups down through the passages, this action of the cups will vary in time, as will be more fully described hereinafter and described in the operation of the device.

Mechanical construction of the scale.

Sheets V, VI, and VII. The numeral 1 represents a bifurcated standard having the forks 2 and 3. On their tops the forks 2 and 3 are provided with dovetail recesses 4 in which are secured trunnion blocks 5 having on their tops V-shaped recesses 6. Extending outwardly from the top of the fork 2, close to the recess 4, there is a bracket 7 provided with a vertical slot 8. In this vertical slot 8 there is a block of insulating material 9. Placed in this block of insulating material 9 are four cups 10, the solid bottoms of which project down through the block 9 and extend below the bracket 7, and the lower ends are made in the form of binding-posts 11, 11'. To the former 11 are secured the wires C and E of the field circuit; and to the latter 11', the wires $o'$ and $p$ of the two armature circuits. In these cups 10 mercury is to be placed. Resting in the V-shaped recesses 6 of the trunnion blocks 5 are the knife edges 12 of the V-shaped trunnions 13 of a bar 14 which passes through the scale beam 15. Inserted into the mercury of these cups 10 are the pins 10', the bottoms of these pins and the knife edges 12 being in the same horizontal line. Fig. XVII.

A scale beam 15 has on its inner or motor end 16 a seat 17 for the motor M. Back of the pivot 18 of the beam from which the beam hook 19 runs, a beam rod 20 is placed between the motor M and the trunnions 13, and connects with the usual platform mechanism. Projecting from the upper surface of the scale beam 15 and in one piece therewith is a bracket 21, and to one side a bracket 22 alined with the bracket 7 of the standard 1. The bracket 22 has the block of insulating material 9' in which are held the pins 10' which are inserted in the mercury of cups 10. The bracket 21 has through it a bore 23 provided on the side away from the motor with an enlarged counter-bore 24, and at its top a hole 25. Placed in the counter-bore 24 is the circular ball race 26 having in its bottom the circular perforation 27 centered with the bore 23 of the bracket 21. At its outer end, the beam 15 is provided with another bracket 28 rising therefrom and integral therewith having a cap 29, the cap and bracket having between them a bore 30 in which is placed a ball race 31 similar in construction to the ball race 26. Within the ball races 26 and 31 are placed the balls 32 and 33. Passing through the ball races 26 and 31, and amidst the balls 32 and 33 are the ends 34 and 35 of the beam screw 36. This beam screw has the conical portions 37 and 38 where the balls 32 and 33 bear against it. The end of the beam screw which passes through the ball race 26 is elongated and extends out through the bore 23 of the bracket 21 and beyond the bracket. The extremity of the end 34 of the beam screw is held by a suitable coupling 38' to the protruding end 39 of the armature shaft 40 of the motor M so that the armature shaft and the beam screw are practically one structure. Around the beam screw 36 is located the poise 41. This poise 41 consists of a box made in duplicate halves 42 and 43 held together by the transverse bolt 44. Figs. XIX, and XX. The beam screw 36 passes through the openings 45 and 46 of this poise, and the lower part of the poise straddles the beam 15. Within the poise and above the beam screw 36 there are located side by side two smaller shafts 47 and 48. The ends 49 of these shafts 47 and 48 are held in the ball races 50 secured at one end of the poise 41. The other ends 51 of the shafts 47 and 48 are made in the shape of ball races and a screw 52 passes through that end of the poise 41 and has a tapered end 53 which bears against the balls in the ball race ends of the shafts 47 and 48. Each shaft 47 and 48 has thereon two circumferentially grooved rollers 54 and 55. Of these three rollers the roller 55 runs loose on the shaft, but the roller 54 is made tight upon the shaft 47 so that the shaft and roller will turn together. At each end of each half 42 and 43 of this poise 41, on the inside, there is made a slight kerf 56. Alined with these kerfs are the threaded openings 57 in which are placed the screws 58. At the outer end the scale beam is provided with a projection 59 which extends out through an opening 60 in a standard 61 of the scale beam. Sheets VI and VIII, Figs. XIII, XXII and XXIII. On the outside the standard 61 has two clamping jaws 62 and 63 hinged thereto, one jaw being above and the other jaw being below the protruding end 59 of the scale beam 15. On the projecting ends 64 and 65 of these clamping jaws 62 and 63 are secured lever arms 66 and 67 having toothed segments 68 and 69 engaging each other. One of these lever arms, as 67, is connected by a rod 70 with a bell-crank lever 71 connected by a rod 72 with the shaft G. Sheet VII, Fig. XVIII. The beam 15 has on its under side, near its outer end, a balance ball 73 and the pivot 74 on which a counter-weight may be hung if desired. Immediately under the trunnions 13 the scale beam 15 has attached to it the gravity ball 75 (Sheet VI). Just within the inner edge of the bracket 21 the beam screw 36 has secured thereon a gear wheel 76 to engage the counter wheels (Sheet V). In the hole 25 in the top of the bracket 21 is secured a counter 77, the gear wheel 78 of which meshes with the gear wheel 76 on the beam screw 36. This counter 77 may be arranged with two sets of figures, the adjustment being such as when a set of figures is in line for printing a duplicate set will be in sight, so that the operator can read just what is being printed by the machine.

Just above the counter is placed the recording mechanism. Sheets V, VIII, IX. This is supported by an elongated frame 79 having the two legs 80 and 81, the bottom offsets 82 and 83 of which are secured to other offsets 84 (Sheet VII, Fig. XVI) and 85 made with the forks 2 and 3 of the standard 1. Secured to the inner face of the elongated frame 79 are two guide brackets 86. Placed on the tops of these guide brackets 86 is a slide bar 87 having at its front end 88 a rack 89 on the under side, and on its top in the middle a number of letters or symbols 90. At its rear end 91 this bar has secured to it one end of a spring 92, the other end of which is secured to the frame 79. The brackets 86 are so placed on the frame 79 in relation to the counter 77 that the letters or symbols 90 on the bar 88 will be on a line with the tops of the counter wheels so that when an impression is taken of the figures on the counter wheels at the same time an impression will be taken of a letter or symbol on the bar 88. Held by a pivot 93 to the frame 79 below the rack end of the bar 90 is a segmental lever 94 having at its top a curved toothed surface 95 adapted to engage the rack 89 of the bar 90 and having at its lower end 95 the flattened part 96. In Sheet IV, Fig. XI, wherein is shown the switch $o^2$, which is in the armature circuit, Sheet I, there is shown a device for contacting the two parts $o^3$ and $o^4$ of this switch. As shown in Fig. XI, this is for convenience an ordinary barrel lock key. The key 97 passes through the lock and engages the lever arm or bolt 98 on the inside of the barrel. On turning the key 97 and the bolt 98 the end 99 is forced against the spring $o^4$ and presses it against a stationary portion $o^3$ of the switch $o^2$, which closes the switch. At the same time the point 100 of the key 97 bears against the flattened end 96 of the segmental lever 94 turning the lever 94, and operating upon the rack bar 90, moves this bar outward against the tension of the spring 92. Sheet VIII, Fig. XXI. Different lengths of keys will bring different letters or symbols on the top of the bar 90 in line with the figures at the top of the counter wheel.

To the inner face of the back 101 of the frame 79 there is secured the paper-supply roll support 102. Sheets VIII, IX. Figs. XXI, XXV, XXVI. This paper-supply roll support 102 consists of a stud 103 by which the paper-supply roll support is secured to the back 101 of the frame 79. This stud 103 has a groove 104 in its surface in which is secured by one end a flat spring 105. Around the stud 103 at the ends are placed circular plates or washers 106 and 107, the plate 106 being loose on the inner end of the stud 103, while the plate or washer 107 fits snugly against a rabbet 108 at the extreme outer end of the stud 103, and the said plate or washer 107 is held tightly in place in the rabbet 108 by the thumb screw 109, which is threaded and takes into the outer end of the stud 103. The roll of paper to be used is placed on the stud 103 and between the two plates or washers 106 and 107.

To the inner face of the back 101 and beneath the paper-supply roll support 102 there is secured the printing pad frame 110. Sheets VIII, XI. To the back 101 there is secured, by a threaded connection, an elongated, hollow bearing 111. Sleeved in the bore 112 of this hollow bearing 111 is a shaft 113, to the inner protruding end 114 of which there is keyed a lever 115. To the outer end 116 of the lever 115 there is loosely jointed the upper end 117 of a downwardly extending link 118. The lower end 119 of this downwardly extending link 118 is pivotally held by a pin 120 between two ears 121 secured to the middle of edge 122 of the printing pad support 123. In the under side of the edge 122 of the printing pad support 123 there is made a dovetail groove in which is inserted the printing pad 124. At the other edge the printing pad support is provided with two perforated ears 125 spaced apart. Secured to the back 101 and extending from the front face thereof and passing loosely through the perforations of the ears 125 is a stud 126, the frame being secured on the stud 126 by a pin 127. On this stud 126 between the perforated ears 125 there is loosely placed a hard rubber roller 128 having at its ends the flanges 129. The shaft 113 also projects behind the back 101 of the frame 79 and to its protruding end 130 there is keyed a lever 131 of a device hereinafter to be explained. Sheet IX, Fig. XXIV.

Also secured to the inner face of the back 101 of the frame 79, somewhat in line with printing pad frame but on the side away from the paper-supply roll, is the paper feeding roll mechanism. Sheets V, VIII, X. A frame 132 is made with the two triangular sides 133 and the connecting back 134. In the back 101 of the frame 79 there is made an orifice 135. In this orifice there is keyed the enlarged end 136 of a stud 137 which projects inwardly from the back 101. Besides the enlarged end 136 secured to the back 101 this stud 137 has just inside the end 136 a smaller reduced portion 138 which is made as an eccentric and the elongated main portion 139, from the extreme end 140 of which there projects outwardly another eccentric 141, the eccentricity of the parts 138 and 141 being the same. The frame 132 is hung upon this stud 137. One of the triangular sides or jaws 133 has a hole 142 fitting to the eccentric 138 of the shaft 137 and the other jaw 133 has a hole 143 fitting the other eccentric 141. Loosely fitting the elongated main portion 139 of the stud 137 is a roller 144 having a soft rubber covering 145 and at its end 146 a gear wheel 147 keyed thereon. Alined with the roller 144 is another roller 148 having a gear wheel 149 meshing with the wheel 147. This roller 148 is loosely sleeved upon a stud 150 which is secured at its outer end 151 in one of the triangular sides or jaws 133 passes through the roller 148 and its other end 152 bears loosely in the other jaw or side 133. In the connecting back 134 of the frame 132 is an elongated recess 153 arranged transverse of the frame 132. Passing through the back 134 of the frame 132 is a bolt 154. This bolt has a reduced end 155 adapted to a recess 156 in the back 101 of the frame 79. Next to this reduced end 155 the bolt 154 has a collar 157 adapted to fit snugly the elongated recess 153. Surrounding the main portion 158 of the bolt 154 and between its collar 157 and a shoulder 159 at the other end of the elongated recess 153 is a spiral spring 160. The bolt 154 may have a knurled head 161.

Secured to the face of the back 101 of the frame 79, above the paper-feeding rolls and parallel with the paper-supply roll is the paper take-up mechanism. Sheet XII, Figs. XXXVI and XXXVII. Projecting inwardly from the inner face of the back 101 of the frame 79 and firmly secured therein is a stud 162. Loosely turning on the stud 162 is a reel 163 having the barrel 164 through which the stud 162 passes and integral with such barrel 164 the circular flange or wheel 165 having the teeth 166 on its edge. Adapted to engage the periphery of the barrel 164 of the reel 163 is a spring clamp 167 made barrel shape, and consisting of a number of elastic prongs 168 and a head 169 having a knurled handle 170. Loosely pivoted upon the stud 162 between the back 101 and the flange 165 of the reel 163 is the inner end 171 of a pawl lever 172. This pawl lever 172 has secured to it in line with the teeth 166 a pawl 173 adapted to engage said teeth 166. There is also secured to the frame 101 in line with the teeth 166 a retaining pawl 174 adapted to engage the teeth 166. At the outer end 175 of the pawl lever 172 the frame 79 is made with a notch 176. Sheet IX. The spring pawl 173 is provided with a pin 177 which extends backward through the notch 176 and projects beyond the outer face of the back 101 of the frame 79 where it projects through a slot 178 in the upper end 179 of a downwardly projecting link 180, the lower end 181 of which is pivotally connected to the lever 131, which, at its inner end, is keyed upon the end 130 of the shaft 113, as has been already stated. From the outer end 175 of the pawl lever 172 there extends upwardly a spring 182, the upper end 183 of which is secured to a stud 184 projecting from the frame 79. The lever 131 projects outwardly beyond the lower end 181 of the link 180 and has its outer end 185 loosely connected to the upper end 186 of a downwardly projecting link 187, the lower end 188 of which is secured loosely to the outer end 189 of another lever 190 keyed at its end 191 to the outer projecting end 192 of a shaft 193, shown in detail on Sheet X, Fig. XXVII, the principal function of which is to be hereinafter described. To the protruding end 185 of the link 131 there is pivotally connected the upper end 194 of a downwardly extending link 195 connected at its lower end to a bell crank lever 196, which is connected by a link 197 with the shaft G. The details of the levers above described are to be found on Sheets IX and VII.

The shaft 193 already referred to passes through an elongated bearing 198 secured in the back 101 of the frame 79 (Sheet X) and projecting from the inner face of such back, carries the ink ribbon feed roller 199. This roller 199 has at its end 200 a gear wheel 201 which is arranged to intermesh with the gear wheel 147 of the roller 144 of the paper-feeding mechanism. At its other end 202 the roller 199 is made with a circular head 203 forming the rabbet or shoulder 204 which acts as a guide for the inking ribbon and having in its outer face the circular recess 205 in which freely fits the circular head 206 of the shaft 193. In the edge of this head 206 there is made an angular notch in which is placed a ball 208 bearing on one side on the inner side of the notch 207 and on the other side against the inner face of the recess 205. Over the head 206 there is fastened a plate 209 by a screw 210 closing the recess 205 and retaining the ball 208 therein.

Located at the top corners of the frame 79 are two ink ribbon guide rollers 211, and there is a third one located near the bottom of the frame and substantially in line with the ink ribbon feed roller 199. These consist of hard rubber rollers 212 having flanged ends 213 secured to or turning loosely on the studs 214, held tightly by their ends 215 in the back 101 of the frame 79. The details of one of these studs is illustrated in Sheet XII, Fig. XL.

In the middle of the top of the back 101 of the frame 79 is located the ink ribbon tension device 216. Sheet XII, Figs. XXXVIII and XXXIX. A stud 217 is fastened by the end 218 to the back 101 of the frame 79 and projects from the inner face of said back. Held loosely on the stud 217 is a barrel 219 having made integral therewith an arm 220, to the outer end 221 of which is rigidly secured the end 222 of a stud 223. On this stud 223 there is loosely secured a roller 224 having the flanges 225 at its end. This ink ribbon tension device is located so that the roller 224 will be in the path of the ink ribbon and bear thereon.

USE.

Location of parts.

When all the various parts are assembled together in an operative mechanism or completed scale for use, the various details will be in the positions indicated in the drawings, except that Sheet I shows the position of all the various electrical apparatus before beginning the operation, while Sheets II and III show the positions of the several parts of the several circuits except that the commutators are left in the same position as that in which they are shown in Fig. I so as to prevent confusion and because the location and operation of commutators are well understood. Moreover, Sheet IV, Fig. VIII shows the positions of the several parts of the relay cups when the solenoids are devitalized, and the views in Figs. IX and X show the positions of the parts of the relay cups when the solenoids are vitalized.

Around the ribbon guide rollers 200 and the ink ribbon feed rollers 199 is placed the usual ink ribbon, the same being properly located in the path of the printing pad 124 and between the printing pad 124 and the counter 77 in the ordinary way. And on top of the face of this ink ribbon there is the ink ribbon tension device 216. On the paper supply roll support 102 is placed the ordinary paper supply roll, being held thereon by the washer 107 and the thumb screw 109. The loose end of the paper is passed under the printing pad 124 above the ink ribbon, then under the roller 128 secured to the printing pad support 123, then passed under the roller 148 and then up and between the roller 148 and the roller 144 of the paper feeding roll mechanism. To permit of the free passage of the paper between the two rolls 144 and 148, the bolt 154 is released from the recess 156 of the frame 79 and the paper feed roll mechanism is turned upon the eccentrics 138 and 141 thereby separating the two rollers 148 and 144 for the free passage of the paper. The loose end of the paper is then passed around the reel 163 of the paper take-up mechanism on which reel the end of the paper is securely held by the spring clamp 167 which is sprung over the end of the paper holding it firmly on the reel 163.

OPERATION.

It will be noted that prior to using the scale the circuits are all open, each being separated at some particular point.

Each operator is provided with a specially designed key so that, as will be hereinafter indicated, the record of the scale shows just exactly which operator does the weighing.

The operator inserts his key 97 so that it engages the lever arm 98 and the turning of the key forces its end 99 against the spring $o^4$, pressing the latter against the stationary portion $o^3$ of he switch $o^9$, thus closing the switch $o^2$. The object to be weighed is then placed upon the platform, which, as has already been stated, it is not necessary to show, but which is connected with the weighing apparatus through the beam rod 20.

The operative handle N' is then turned in the position shown in dotted lines in Fig. I, turning the shaft G, the commutators H, K, and L and the ratchet wheel N. When this is done, the pawl $v^7$ of the armature $v^6$ engages the teeth $n$ of ratchet N, while the pair of brushes $e$ and $e'$ bear upon the metallic strip $h$ of the commutator H, and the pair of brushes $f^4$ and $f^5$ bear upon the metallic strip $l$ of the commutator L and the metallic strip $k$ of the commutator K is moved out of contact with the pair of brushes $w'$ and $w^2$.

*The field circuit*, (Fig. II.)

As the parts are given the positions thus stated, the field circuit is closed. The current flows from the positive plate $c$ of the cell $a'$ of the battery A through the wires F' and F, brush $e'$, metallic strip $h$ of the commutator H, brush $e$, wire E, to the field D of the motor M, thence by wire C to the negative plate $c'$ of the cell $a'$ of the battery A.

*The starting circuit*, (Fig. III.)

At the same time current flows from the same positive plate $c$ of the cell $a'$ of the battery A through the wires F', $F^2$, to the binding post $F^3$ of the relay cup R (Figs. III and X), thence by wire $f$ to the brush $f'$, metallic strip $s^7$ of the commutator $s^5$ on the shaft $s'$, brush $f^2$, wire $f^3$, brush $f^4$, metallic strip $l$ of the commutator L, brush $f^5$, wire $f^6$ to the lower solenoid $r^2$ of the relay cup R, thence by wire $r^3$ to the lower solenoid $q^6$ of the relay cup Q, thence by wire $q^7$ to the binding post $q^4$ of the relay cup Q (Figs. III, IX, and X), thence by wire $q^5$ to the negative plate $c'$ of the cell $a$ of the battery A. As the current thus flows through the starting circuit, as indicated in Fig. III of the drawings, the two lower solenoids $r^2$ and $q^6$ are vitalized. This draws down the soft cores $y^4$ and $z^4$ of the relay cups Q and R releasing the pressure against the spring contacts $f^7$ and $q^2$, and the spring contacts coming down, break at the binding posts V and $q^8$ and form a contact through the binding posts $r^4$ and $q^4$.

*The direct armature circuit*, (Fig. IV.)

The closure between the spring contacts $q^2$ and binding post $q^4$ closes the direct armature circuit as follows: The current passes from the positive plate $c$ of the cell $a$ of the battery A through the connecting wire B, the wires O, $o'$, and switch $o^2$, wire $o^5$ to the armature M' of the motor M. It passes thence by the wire $p$ to the binding post $p'$ of the relay cup P (Fig. VIII), spring contact $p^2$, wire $p^3$, upper solenoid $q$ of the relay cup Q, thence by wire $q'$ to the upper relay $r$ of the relay cup R. Thence by wire $r'$ to the spring contact $q^2$ of the relay cup Q (Figs. IX and X), through the contact point $q^3$ to the binding post $q^4$, the vitalized solenoid $q^6$ in the starting circuit holding down the soft core $y^4$, thus allowing the spring contact $q^2$ to contact with the contact $q^3$, thence by wire $q^5$ to the negative plate $c'$ of the cell $a$ of the battery A. It may be noted in passing that while the field circuit has the power of the full battery, that is both cells, the direct armature circuit has only the power of one-half of the battery, that is one cell. That is to say, the field circuit has twice the potential of the direct armature circuit.

*Cutting-out circuit*, (Fig. V.)

When the closure is made between the spring contact $q^2$ and the contact point $q^3$ of the binding post $q^4$, thus closing the direct armature circuit, the cutting-out circuit is also closed. The current flows from the positive plate $c$, of the cell $a$ of the battery A through the connecting wire B, wires O, T, solenoid $s^{11}$, wire T, brush $t$, metallic strip $s^6$ of the commutator $s^4$ on the shaft $s'$, brush $t'$, wire T', to the wire $r'$ at the point $t^2$, wire $r'$, spring contact $q^2$, binding post $q^4$, wire $q^5$, to the negative plate $c'$ of the cell $a$ of the battery A. The current of this cutting-out circuit vitalizing the solenoid $s^{11}$ causes, through the pinion $s^8$ and rack $s^9$, the shaft $s'$ to rotate away from the two sets of fingers already described. This moves the metallic strips $s^6$ and $s^7$ away from the pairs of brushes $t$ and $t'$, $f'$ and $f^2$, thereby breaking both the starting circuit and, by virtue of the momentum of the moving plunger, the cutting-out circuit. At the same time, the metallic strip $s^3$ of the commutator $s^2$ is brought into contact with the pair of brushes $v'$ and $v^2$ making a closure at that point. The breakage of the starting circuit causes a devitalization of the lower solenoids $q^6$ and $r^2$ of the relay cups Q and R. But the upper solenoids $q$ and $r'$ remaining vitalized because they are in the direct armature circuit, the spring contacts $f^7$ and $q^2$ still remain down.

*Act of weighing.*

The current thus being established in the field and in the armature of the motor, the motor begins to operate. As the armature revolves it turns with it the beam screw 36, which causes the poise 41 to travel outward and at the same time causes the counter 77 to be operated. The scale beam oscillates on the trunnions 13, the knife edges 12 moving in the recesses 6 of the trunnion blocks 5 (Fig. XVI). As the bottoms of the pins 10' and the knife edges 12 are in the same horizontal line, the axis of oscillation of the edges and bottoms of the pins is the same, so that the contacts in the cups 10 are permanent. The poise 41 straddling the beam 15, of course cannot turn thereon, and as the threads of the beam screw 36 engage the rollers 54 and 55 on their shafts 47, the poise 41 necessarily moves outwardly along the beam screw 36 and by having the rollers 54 and 55 placed on shafts which have ball bearings, all necessity of lubricating the poise is obviated. The poise 41 continues to run out on the beam until the position of the poise on the beam 15 causes the outer swinging end of the beam 15 to drop, making the contact point $u'$ to touch the contact point $u^2$ which produces a closure of the reverse armature circuit.

As soon as the contact point $u'$ touches the contact $u^2$, the current which enters the armature $M'$ of the motor M from the wire $o^5$ and passes through the wire $p$ begins to flow through the wire $u$, the scale beam, contact points $u'$ and $u^2$, wire U, solenoid $p^4$ of the relay cup P, wire U' to the point $u^3$ of the wire $q'$, wire $q'$, upper solenoid $r$ of the relay cup R, spring contact $q^2$ in the relay cup Q, which is down, binding post $q^4$, wire $q^5$, and plate $c'$ of the cell $a$ of the battery A. That is the direct armature circuit has been divided. As soon as ever the current thus passes through the beam and contact $u'$ and $u^2$, and thence forward, as explained, the solenoid $p^4$ of the relay cup P becomes vitalized, drawing down the soft core $x^4$. This permits the spring contact $p^2$ to come down breaking contact with the binding post $p'$. This immediately makes a break in the direct armature circuit and the upper solenoid $q$ of the relay cup Q becoming devitalized, the soft core $y^4$ rises and breaks contact between the spring contact $q^2$ and the contact $q^3$ of the binding post $q^4$. The direct armature circuit is effectually broken at $q^2$ and $q^3$. This breakage of the direct armature circuit at $q^2$ and $q^3$ tends to devitalize the upper solenoid $r$ of the relay cup R. But the differentiation in the upward action of the two soft cores $y^4$ and $z^4$ is such that the spring contact $q^2$ in the relay cup Q is more rapidly raised than would be the spring contact $f^7$ in the relay cup R. While this differentiation is not limited to a precise ratio, it is found in actual practice that a good ratio is 1 to 6. That is the opening $y^8$ in the cup $y^7$ at the bottom of the soft core $y^4$ is gaged so that the mercury will pour out of this passage $y^8$ in about a half of a second, while the mercury in the cup $z^7$ at the bottom of the soft core $z^4$ of the relay cup R is of a size to permit the mercury to pass out in about three seconds.

By this differentiation between these two openings and the speed at which the cups are emptied, it will be seen, as stated, that the spring contact $q^2$ will be raised much more quickly than would be the spring contact $f^7$. The result of this is that when the current flows through the solenoid $p^4$, as already described, and the direct armature circuit is broken and the solenoids $q$ and $r$ are devitalized, the spring contact $q^2$ is forced up forming electrical contact through the binding post $q^8$. As soon as this occurs, the reverse armature circuit is put into operation.

*Reverse armature circuit,* (Fig. VI.)

As has been already stated, current flows from the positive plate $c$ of the cell $a'$ of the battery A through the wire $F^2$ to the binding post $F^3$ of the relay cup R. From this binding post $F^3$ the current flows through the spring contact $f^7$ to the binding post $r^4$ of the relay cup R, thence by wire $u^4$ to the binding post $q^8$ of the relay cup Q, thence to spring contact $q^2$ and wire $r'$ to the upper solenoid $r$, of the relay cup R, by wire $q'$ to the point $u^3$ (Figs. VI, IX and X) thence by wire U' to the solenoid $p^4$ of the relay cup P, thence by wire U (Fig. VIII) to the contact point $u^2$ through contact point $u'$, scale beam 15, wire $u$, armature $M'$ of the motor M, wire $o^5$, switch $o^2$, wire $o'$, wire O, connecting wire B to the negative plate $c'$ of the cell $a'$ of the battery A. As the current thus flows the solenoid $r$ is revitalized before there is a break between the spring contact $f^7$ and the binding post $r^4$, the differentiation before mentioned allowing this action and the spring contact $f^7$ thus remaining down. It will be again observed that the potential of this reverse armature circuit is only that of one cell or that of one-half of the field circuit. That is the direct armature circuit and the reverse armature circuit each has the same potential, namely, one-half that of the field circuit. The field circuit works with both cells, while the direct armature circuit works with one cell and the reverse armature circuit with the other cell.

This differentiation in action of the relay cups Q and R causes the armature circuit, thus divided, to overrun the exact point of balance, and the poise continues to move outward until the soft core $y^4$ rises and breaks the contact at $q^3$. However, as soon as ever the current is established through the reverse armature circuit, as has already been explained, the motor reverses the action and causes the poise to be moved inward. As soon as ever the poise moves sufficiently far inward, that is toward the motor, so as to separate the contact $u'$ from the contact $u''$, a break is made at the outer or swinging end of the beam, and the reverse armature circuit is, of course, immediately broken. This occurs at the exact point of balance. The direct armature circuit having been broken, the poise cannot move outward again. Both armature circuits being broken, the field circuit immediately operates as a brake on the revolving screw.

*Shaft unlocking and shaft locking circuits combined,* (Fig. VII.)

As soon as ever this balance occurs and the reverse armature circuit is broken, the spring contact $f^7$ is forced upward by the soft core $z^4$ and forms an electrical contact with the binding post V. Here again the differential between two of the relay cups produces this closure of the spring contact $f^7$ with the binding post V. Upon the break in the reverse armature circuit, the solenoid $p^4$ of the relay cup P and the upper solenoid $r$ of the relay cup R become devitalized. The other solenoids of the relay cups having been devitalized, as already explained, the soft core $x^4$ of the relay cup P and the soft core $z^4$ of the relay cup Z both rise. The size of the passage $x^8$ of the cup $x^7$ of the relay P is smaller than that of the passage $z^8$ of the cup $z^7$ of the relay R. It has been found in practice that a good ratio is that of 4 to 3, that is that the discharge of mercury through the passage $x^8$ is such that the soft core $x^4$ will be four seconds in rising, while the size of the passage $z^8$ is such that the core $z^4$ will be three seconds in rising, as has been already stated. The result will be that the closure will be made between the contact $f^7$ and the binding post V before closure is made between the spring contact $p^2$ and the binding post $p'$. This closure will be in the shaft unlocking and shaft locking circuits combined, and not in the direct armature circuit.

The current thus flows from the positive plate $c$ of the cell $a'$ of the battery A through the wires $F'$ and $F^2$ to the binding post $F^3$ through the spring contact $f^7$, binding post V and wire $v$, finger $v'$, metallic strip $s^3$ of the commutator $s^2$ on the shaft $s'$, finger $v^2$, wire $v^3$, lamp $v^4$, electro-magnet $v^5$, wire $v^8$, binding post $q^4$, wire $q^5$ to the negative plate $c'$ of the cell $a$ of the battery A. As soon as ever this circuit is established, the lamp $v^4$ indicates to the operator that the operation of weighing is finished, and also that the pawl $v^7$ has been released from the teeth $n$ of the ratchet wheel N on the shaft G.

Thereupon the handle N' may be turned into the position indicated by full lines in Fig. I. This movement of the shaft G through the link 72, bell crank lever 71, and link 70 causes the jaws 62 and 63 to come together and firmly clamp the protruding end 59 of the scale beam 15 (Figs. XVIII, XXII and XXIII). The same movement of the shaft G through the link 197, bell crank lever 196 and link 195 draws down the lever 131, which, through the shaft 114, causes the printing pad frame 110 to descend forcing the printing pad 124 on the paper, whereby the line of figures and the symbol of the operator are impressed upon the strip of paper between the ink ribbon and printing pad 124.

As the handle N with the shaft G is thus turned to cause the printing, as described, the metallic strip $k$ of the commutator K on the shaft G is brought so that the pairs of fingers $w'$ and $w^2$ will bear against this strip $k$. As soon as ever this is done current from the finger $v^2$ will pass, as indicated by dotted lines shown in Fig. VII, through the wire $w$ to the solenoid $s^{12}$ on the frame S, thence by the wire $w$ to the finger $w'$, metallic strip $k$, wire $w^3$, binding post $q^4$, wire $q^5$, to the negative plate $c'$ of the cell $a$ of the battery A. As soon as ever the current thus flows, the solenoid $s^{12}$ being vitalized, will, through the rack $s^9$ and pinion $s^8$, cause the shaft $s'$ to rotate turning the metal strip $s^3$ of the commutator $s^2$ from the fingers $v'$ and $v^2$ breaking its own circuit and the unlocking circuit at that point, which devitalizes the electro-magnet $v^5$, when the pawl $v^7$ will drop so as to be ready to engage with the teeth $n$ of the ratchet wheel N. As the shaft $s'$ is thus turned, the metallic strips $s^6$ and $s^7$ are again placed in position so that the pairs of brushes $t$ and $t'$ and $f'$ and $f^2$ bear upon them. At the same time the lever 190 is moved so as to partially turn the ink ribbon feed roller 199 by means of the clutching mechanism 205, 206, 207, 208, and by means of the gears 149 and 201 to partially turn the rollers 144 and 148 of the paper feeding roll mechanism. The mechanism is now ready to be again used.

*Paper take-up mechanism.*

In this device the paper take-up mechanism is compensatory, that is, it is so adjusted that as the machine is used and the paper is withdrawn from the paper supply roll, which, of course, becomes smaller and is turned around the paper take-up mechanism, the roll on this becoming larger, there is compensation for the difference in size of these two rolls.

As the lever 131 is caused to descend, as already described, through the link 180 and the slot and pin connection 178 and 177, the pawl lever 172 is drawn down. As soon as ever the downward pressure on the lever 131 is released the spring 182 draws up, and the lever pawl 172 and the pawl 173 engaging one of the teeth 166 of the wheel 165 causes the paper to be partially turned around the reel 168.

If the pawl lever 172 and the link 180 were held together without any pin and slot or other differential allowance, the return of the pawl lever 172 and consequent action of the pawl 173 would always be the same, and the rotation of the reel 168 would be constant. But by the pin and slot connection and the action of the pawl 172 being caused by the spring 182, there is due compensation for the increasing size of the paper roll upon the reel 168. As the link 180 is raised by the positive action of the lever 131, the pin 177 plays in the slot 178 and the spring 182 has free and independent action upon the pawl lever 172. So that as the roll of paper upon the reel 168 increases, the spring 182, having its free action, accommodates the movement of the pawl 173 to this increasing size of the roll.

What I claim is:

1. A reverse armature circuit consisting of two sources of electricity, a connection between the inside positive pole of one and the inside negative pole of the other, a wire leading from this connection to the armature, a wire connecting this armature with one end of a scale beam, a scale beam, a wire leading from a contact adjacent to the other end of the scale beam, in combination with three relay cups, the wire leading from the other end of the scale beam having a solenoid in one relay cup, a wire leading therefrom having a solenoid in another relay cup, a wire leading from the solenoid to a spring contact in the third relay cup, the spring contact, a wire leading from this spring contact to a spring contact in the second relay cup, this spring contact, and a wire leading from this spring contact to the outside positive pole of the source of electricity, from the negative pole of which the wire runs to the armature.

2. The combination of a scale beam provided with trunnions, a standard therefor provided with trunnion seats, a motor placed upon one end of the beam provided with field and armature circuits having moving connections, the axis of oscillation of the beam and of these moving connections being coincident.

3. The combination of a scale beam provided with knife edge trunnions; standards therefor provided with complementary trunnion blocks; a motor placed upon one end of the beam having field and armature circuits; wires leading to such field and armature circuits having moving connections such connections consisting of a mercury cup on one side and a pin on the other, the axis of oscillation of the beam and of the moving connections being coincident.

4. The combination of a scale beam provided with insulating material and pins secured therein, a standard provided with insulating material and mercury cups therein, the pins being in the cups and spaced from the walls thereof, a motor placed on the scale beam and having field and armature circuits connected with such pins, and complementary wires of the two circuits secured to the cups.

5. A scale having a poise provided with two shafts, a wheel on each shaft, a screw engaging the wheels, the latter serving to support the poise on the screw, and means automatically to turn the screw.

6. A scale poise provided with two shafts, each shaft having thereon two wheels, one wheel of one shaft being fast and the other three being loose, a screw engaging the wheels, and means automatically to turn the screw.

7. The combination of a scale beam provided with a beam screw and a poise through which the beam screw passes, such poise being provided with two longitudinal shafts having thereon wheels which engage the beam screw, and support the poise thereon and means automatically to turn the screw.

8. The combination of a scale beam provided with a beam screw and a poise through which the beam screw passes, such poise being provided with two longitudinal shafts having thereon gear wheels which engage the beam screw, one gear wheel being fast and the other being loose.

9. The combination with a scale beam of a poise, means for automatically moving the latter, a lock which engages an outer or swinging end of the beam, starting means for starting a beam tipping movement of the poise, and means coöperatively associated with the poise starting means adapted to release said lock upon actuation of said starting means.

10. The combination with a scale beam of a standard through which one end of the beam passes, a poise, means for automatically moving the latter, a lock secured to said standard and adapted to hold the end of the beam, starting means for starting a beam tipping movement of the poise, and means coöperatively associated with the poise starting means adapted to release said lock upon actuation of said starting means.

11. The combination with a scale beam of a fixed part through which the beam passes, a poise, means for automatically moving the same, a pair of clamping jaws secured to said fixed part and adapted to clamp the beam, starting means for starting a beam tipping movement of the poise, and means for actuating the clamp controlled by the poise starting means.

12. In an electric weighing scale, the combination with a motor having a field circuit and two armature circuits, of a scale beam and a poise thereon, means coöperating with said motor and controlled by said beam and one armature circuit for causing the poise to overrun the balance sought, means coöperating with said motor and controlled by said beam and the other armature circuit to return the poise to a balance, and timing means to cut out said last named armature circuit when a balance has been had for a predetermined time.

13. A weighing scale provided with a beam, a poise thereon, means for automatically moving the poise including electric circuits and said beam for operating the same, and a timing device coöperatively associated with said beam for regulating the duration of the currents in such circuits to a predetermined time interval after the poise reaches a position of apparent balance.

14. A weighing scale comprising in combination, a poise, means for automatically moving the poise, means for arresting a portion of the poise moving means on the balancing of the beam, and timing means coöperating with said beam for postponing the rendering of said moving means ineffective to produce the movement of the poise until after the lapse of a given time following the balancing of the beam.

15. In an automatic scale, in combination, a beam, a poise, means for moving the poise to insure a beam tipping movement beyond balance on each weighing, and means controlled by the resultant movement of the beam having provision to reverse the movement of the poise and produce a final weighing movement.

16. In an automatic scale, the combination with a beam, of a poise, means for giving the poise a beam tipping movement on each weighing, means controlled by the resultant movement of the beam for reversing the movement of the poise to provide a final weighing movement, and means controlled by the balancing of the beam having provision for rendering inoperative the moving means.

17. In an automatic scale the combination with a beam, of a poise, means for giving the poise a beam tipping movement, means controlled by the resultant movement of the beam for reversing the movement of the poise and means controlled by the balance of the beam for rendering inoperative the moving means for a predetermined time.

18. In an automatic scale, the combination with a beam, a poise, electrically controlled means for moving the poise including means for giving the same a final weighing movement, and a contact at one side of the beam only, for initiating the final weighing movement whereby such movement is always in the same direction.

19. A weighing scale provided with a poise, a beam, means for automatically moving the poise to tip and balance the beam, means to cause interruption of the poise moving agency following the balancing of the beam, and means coöperatively associated with said beam for controlling the poise moving agency to provide a definite time interval after such interruption and before finally cutting off such poise moving agency.

20. A weighing scale having a beam, a poise, means for automatically moving the poise to balance the beam, an exposed starting element for starting movement of the poise, means for automatically locking said starting element after starting, said means having provision for keeping said element locked until after the lapse of a pronounced interval of time following apparent balance of the beam.

21. A weighing scale having a beam, a poise, means controlled by said beam adapted automatically to move the poise along the beam, a weight recorder comprising distinctive characters, means for automatically operating said recorder in accordance with the movement of said poise to vary the relation of the characters, and means controlled by movement of said beam for permitting the actuation of said recorder to make a record only after the lapse of a definite interval following apparent balance.

22. A weighing scale provided with a beam, a poise, means for automatically moving the poise to balance the beam, a signal for indicating the completion of the weighing operation, and actuating means for said signal having provision controlled by movement of said beam for causing a pronounced interval to elapse after apparent balance and before the action of said signal.

23. A weighing scale comprising a beam, a poise, means for automatically moving the poise, a locking device for the beam, means coöperating with the beam to effect the locking of the beam by said locking device, and having provision for causing a pronounced interval to elapse before locking the beam and after apparent balance is reached.

24. An automatic scale having a beam, a poise, means for automatically moving the poise to effect balance of the beam including a starting element, means for automatically locking the starting element on initiation of the poise movement, and means for automatically releasing the starting element when balance is effected.

25. A machine of the class described comprising, in combination, a scale beam; a poise; actuating means for advancing the latter along said beam; an electric circuit for said actuating means; a manually operated switch for opening and closing said circuit; means to lock said switch on the initiation of a weighing operation, and electric means for automatically unlocking said switch after said beam has finally tilted.

26. A machine of the class described comprising, in combination, a scale beam; a poise; actuating means for advancing the latter along said beam; controlling means for said actuating means including a circuit; a switch therein; a handle for closing said switch; means automatically to lock said handle in its closed position; and electrically operated means for unlocking said handle after the beam has finally tilted.

27. A machine of the class described, comprising in combination, a scale beam; a poise; actuating means for advancing the latter along said beam; controlling means for said actuating means including an electric circuit therefor; a switch in said circuit; a handle for operating said switch movable in one direction for initiating a weighing operation; and automatically operated means for preventing rotation of said handle in an opposite direction prior to the completion of the weighing operation of the beam; and means for automatically unlocking said handle after the beam has finally tilted.

28. A machine of the class described, comprising in combination a scale beam; a poise; actuating means for advancing the latter along said beam; controlling means for said actuating means comprising a handle adapted to be rocked in one direction for initiating a weighing operation; a latch for preventing return movement of said handle prior to the completion of the beam weighing operation; and means for automatically unlocking said latch after the completion of said operation.

29. A machine of the class described comprising, in combination, a scale beam; a poise; actuating means for advancing the same along said beam; controlling means for said actuating means comprising means for energizing said actuating means, electric circuit means and a manually operated switch for closing said circuit for energizing said actuating means; locking means for preventing the opening of said switch after weighing operation has been initiated and prior to the final tilt of the beam; and an unlocking motor automatically energized after said tilt.

30. A machine of the class described comprising, in combination, a scale beam; a poise; actuating means for advancing the latter along said beam; starting means for said actuating means comprising a manually rocked shaft; an electric circuit; a switch controlled by said shaft for closing said electric circuit to energize said actuating means; a dog for preventing movement of said shaft after the weighing operation has been initiated; and automatically operated means for tripping said dog after the beam has finally tilted.

31. A machine of the class described, comprising in combination a scale beam; a poise; actuating means for advancing the latter along said beam; starting means for said actuating means comprising a manually rocked shaft; an electric circuit; a switch controlled by said shaft for closing said electric circuit to energize said actuating means; a dog for preventing movement of said shaft after the weighing operation has been initiated; and means for automatically tripping said dog after said beam has finally tilted comprising an unlocking motor, and an armature therefor.

32. A machine of the class described comprising, in combination, a scale beam; a poise; actuating means for moving the latter along said beam; controlling means for said actuating means comprising a manually operated switch; an electric circuit opened and closed by said switch for energizing said actuating means; means for automatically locking said switch after the latter has been closed to initiate a weighing operation; and means automatically to unlock said switch after the beam has finally tilted.

33. A machine of the class described comprising, in combination, a weighing beam; a poise; actuating means including a starting element for advancing the poise along said beam; and printing means including means for recording the weight and means for coöperating with said starting element for automatically recording by whom the weight was taken.

34. A weighing machine of the class described comprising, in combination, a weighing beam; a poise; actuating means for advancing the latter along said beam; means for locking the beam; and automatic means controlling said locking means for preventing locking of said beam until a predetermined interval has elapsed after apparent balance of the beam.

35. A machine of the class described comprising, in combination, a weighing beam; a poise; actuating means for advancing the poise along the beam; a key for controlling said actuating means, and means coöperating with said key for indicating by whom the weighing operation is initiated.

36. A machine of the class described comprising, in combination, a weighing beam;

a poise therefor, means including a starting element to move said poise lengthwise of said beam; and a printing mechanism coöperating with the weighing mechanism for recording the weight indicated at the completion of a weighing operation; said printing mechanism being provided with means coöperating with said starting element for printing characters to indicate by whom the weight is taken.

37. A machine of the class described comprising, in combination, a weighing beam; a poise; actuating means for advancing the latter along said beam, means automatically to arrest said actuating means after the poise reaches the beam balance point, means coöperatively associated with the last said means to register the weight, and means cooperating with said register to insure the making of a record of the weight before another weighing operation is initiated.

38. A machine of the class described comprising, in combination, a weighing beam; a poise; motor means for moving said poise along said beam; and controlling means therefor comprising starting means and means for automatically locking said starting means on the initiation of a weighing operation: said locking means having provision for automatically releasing said starting means after the beam has assumed a final position.

39. A machine of the class described comprising, in combination, a weighing beam; a poise; means for feeding the latter along the former; and controlling means therefor comprising starting means; means for automatically locking the latter upon the initiation of the weighing operation and time means for automatically releasing said locking means.

40. A machine of the class described comprising, in combination, a weighing beam; a poise; motive means for feeding the latter along the former; and controlling means therefor comprising starting means; locking means for securing said starting means on the initiation of the weighing operation, and time controlling means for delaying the release of the locking means for a predetermined time after said beam assumes a position of rest.

41. A machine of the class described comprising, in combination, a weighing beam; a poise; means for moving the latter along the former; and a recording or printing device for receiving distinctive keys for weighing operations of different characters, a plurality of keys for association with said device, means adapted to be controlled by either of said keys for setting in operation the poise moving means and means comprised by said recording device and adapted to be controlled by either of said keys for making a distinctive record indicating whether the operation is of one character or another.

42. A machine of the class described comprising, in combination, a weighing beam; a poise; actuating means for advancing the latter along the former; means for arresting said actuating means after the beam balances; starting means for said actuating means; means for locking said starting means on the initiation of a weighing operation; and means for delaying the unlocking of said starting means until a predetermined period has elapsed after the beam moves to a final position.

43. A machine of the class described comprising, in combination, a beam; a poise; motor means for moving said poise along said beam; and controlling means for said motor means coöperatively associated with said beam and including means for automatically insuring a final balance of the beam, and means for preventing the initiation of a subsequent weighing cycle of operations prior to said balance.

44. A weighing machine comprising, in combination, a beam; a poise; motor means for feeding said poise along said beam; recording means actuated in accordance with the movement of said poise; actuating means for said recording means, and controlling means for said motor means coöperatively associated with said beam and including means for insuring a balance of the beam and means for insuring a record of the weight before the making of a subsequent balance of the beam.

45. A weighing machine comprising, in combination, a beam; a poise; motor means for feeding said poise along said beam; and controlling means for said motor means including an exposed element movable to initiate a weighing operation and means coöperating therewith for locking said element for a pronounced interval of time following apparent balance of the beam.

46. A weighing machine comprising, in combination, a beam; a poise; motor means for feeding said poise along said beam; a lock for said beam; and controlling means including an element for initiating a weighing operation and means coöperating therewith for causing a pronounced interval to elapse after apparent balance before rendering said beam lock effective to lock the beam.

47. A weighing machine comprising, in combination, a beam; a poise; motor means for feeding said poise along said beam; a lock for said beam; controlling means for said motor means including an element for initiating a weighing operation and means coöperating therewith for unlocking the beam on the moving of said element to initiate a weighing operation.

48. A weighing machine comprising, in combination, a beam; a poise; motor means for feeding said poise along said beam; locking means for said beam; controlling means including a starting element movable to initiate a weighing operation; means for releasing said beam locking means and locking said starting element on the initiation of a cycle of weighing operations, said means having provision permitting the operation of said locking means to lock the beam after the latter balances and provision for automatically unlocking said starting element on the completion of the cycle of weighing operations.

49. A weighing machine comprising, in combination, a beam; a poise; motor means for feeding said poise along said beam; locking means for said beam; controlling means including a starting element movable to initiate a weighing operation; means for releasing said beam locking means and locking said starting element on the initiation of a cycle of weighing operations, said means having provision permitting the operation of said locking means to lock the beam after the latter balances and provision for automatically unlocking said starting element on the completion of the cycle of weighing operations; and a signal for indicating the completion of a weighing cycle.

50. A weighing machine comprising, in combination, a beam; a poise; motor means for feeding said poise along said beam; locking means for said beam; controlling means including a starting element movable to initiate a weighing operation; means for releasing said beam locking means and locking said starting element on the initiation of a cycle of weighing operations, said means having provision permitting the operation of said locking means to lock the beam after the latter balances and provision for automatically unlocking said starting element on the completion of the cycle of weighing operations; and means for making a record of the weight.

51. A machine of the class described comprising, in combination, a scale beam; a poise; actuating means for advancing the latter along said beam; an electric circuit for said actuating means; a manually operated switch for opening and closing said circuit; means to lock said switch on the initiation of a weighing operation; and electric means for automatically unlocking said switch after said beam is finally tilted.

52. A machine of the class described comprising, in combination, a scale beam; a poise; actuating means for advancing the latter along said beam; controlling means for said actuating means including a circuit; a switch therein, a handle for closing said switch; means automatically to lock said handle in its closed position; and electrically operated means for automatically unlocking said handle after the beam has finally tilted.

53. A machine of the class described comprising, in combination, a weighing beam; a poise; actuating means for advancing the latter along said beam; means for locking said beam after it assumes a position of balance; means for preventing the operation of said locking means prior to the balancing of said beam; and means for automatically rendering the preventing means inactive after the balance point of the beam is reached.

54. A machine of the class described comprising, in combination, a weighing beam; a poise; a motor for advancing the latter along said beam, means for locking and unlocking said beam; a latch coöperative with said means and actuating means for said latch controlled by the beam and automatically operated after said beam rises to balance.

55. A machine of the class described comprising, in combination, a weighing beam; a poise; motor means for moving said poise along said beam; and controlling means coöperating with said beam, comprising starting means; means for automatically locking said starting means on the initiation of a weighing operation; said locking means having provision for automatically releasing said starting means after the beam has assumed a final position.

56. A machine of the class described comprising, in combination, a weighing beam; a poise; means for feeding the latter along the former; and controlling means coöperating with said beam comprising starting means; means for automatically locking the latter upon the initiation of the weighing operation and time means for automatically releasing said locking means.

57. A machine of the class described comprising, in combination, a weighing beam; a poise; motive means for feeding the latter along the former; and controlling means coöperating with said beam comprising starting means; locking means for securing said starting means on the initiation of the weighing operation, and time controlling means for delaying the release of the locking means for a predetermined time after said beam assumes a position of rest.

In testimony whereof I have affixed my signature in presence of two witnesses.

JOHN V. DAVIS.

Witnesses:
D. V. PIERPOINT,
M. H. YATES.